March 2, 1965
H. V. JONES
3,171,883
INSTRUMENT FOR CHECKING AND INSPECTING CONTACT LENSES
Filed June 6, 1960
3 Sheets-Sheet 1
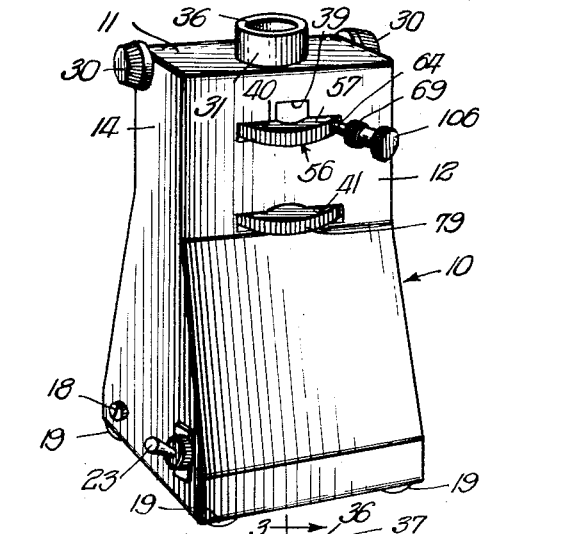
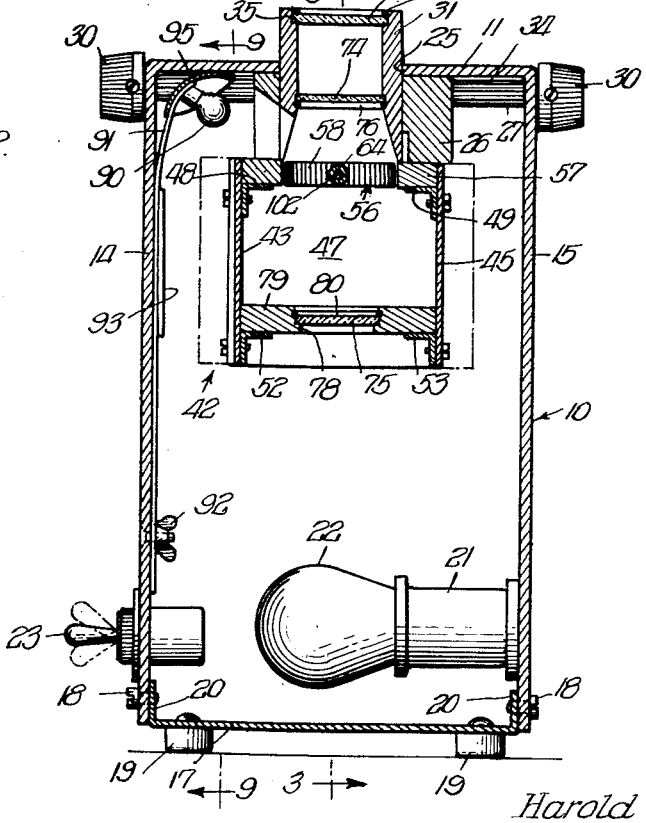
INVENTOR.
Harold Vern Jones,
BY
Cromwell, Greist & Warden
Attys

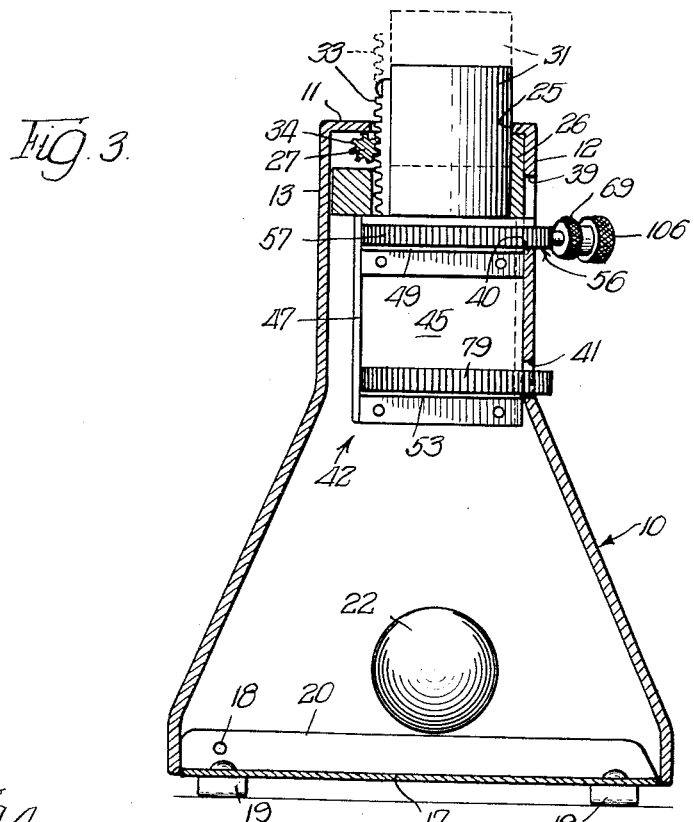
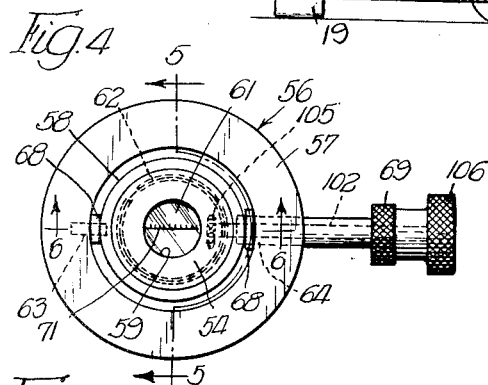
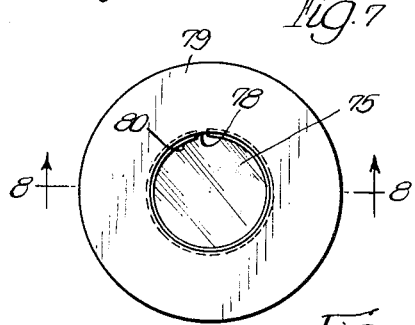
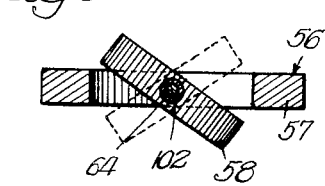
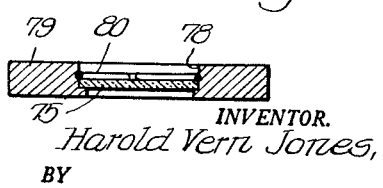
INVENTOR.
Harold Vern Jones,
BY
Cromwell, Greist & Warden
ATTYS.

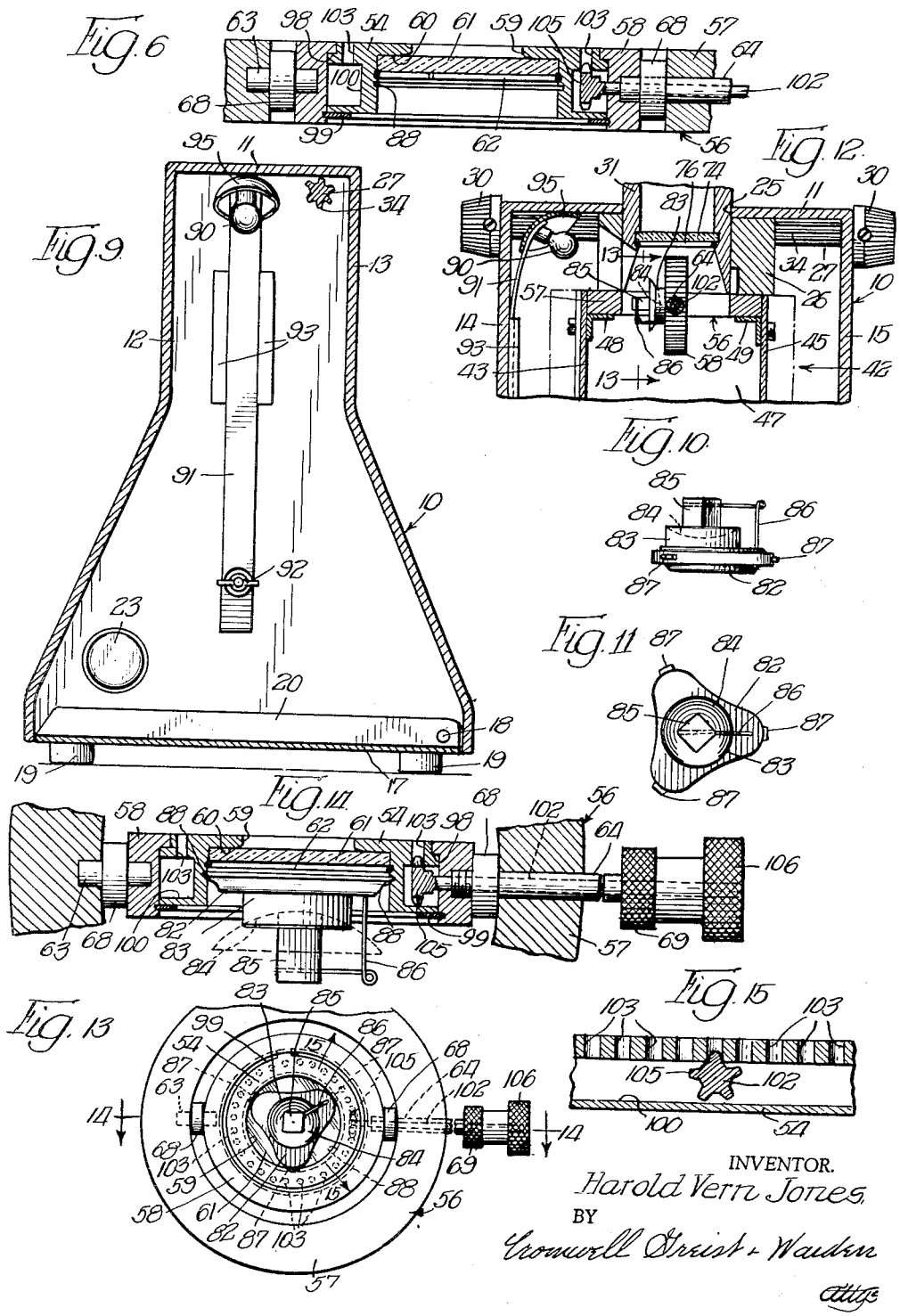

:::: {.patent-header}
United States Patent Office

3,171,883
Patented Mar. 2, 1965
::::

3,171,883
INSTRUMENT FOR CHECKING AND INSPECTING CONTACT LENSES
Harold Vern Jones, 120 N. Walnut St., Champaign, Ill.
Filed June 6, 1960, Ser. No. 34,264
13 Claims. (Cl. 88—56)

The present invention relates to an optical instrument and, more particularly, to an optical instrument for checking and inspecting contact lenses.

It is the general object of the invention to provide a new and novel instrument for checking and inspecting contact lenses including an enclosed housing having a magnifying lens mounted in an opening in the top thereof and a lamp supported in the lower portion thereof, a partially transparent contact lens supporting member, and means for positioning the contact lens supporting member in the housing between the lamp and the magnifying lens.

Another important object of the invention is to provide a contact lens inspector of the character described wherein a calibrated reticle is associated with the transparent portion of the lens supporting member whereby to permit checking of the various curves and dimensions of the lens and wherein the transparent portion of the lens supporting member is tiltable about a horizontal axis whereby to facilitate inspecting of the lens by varying the passage of light therethrough.

A further object of the invention is to provide a contact lens inspector of the character described wherein a pair of polarizing filters are provided in the housing one above and one below the lens-supporting member with one of the filters being rotatable relative to the other whereby to polarize the rays from the lamp and thus control the lighting in the housing.

A still further object of the invention is to provide a contact lens inspector of the character described having a second lamp in the upper portion of the housing, a lens fixture attachable to the transparent portion of the lens supporting member whereby to facilitate inspection of the peripheral curve of the edge of a contact lens supported thereon when the lens supporting member is tilted into a vertical position, and a mechanism for rotating the transparent portion of the lens supporting member in the plane of the lens supporting member whereby to permit inspection of the full length of the contact lens edge.

While the foregoing statements are indicative in a general way of the nature of the invention, other more specific objects and advantages will be apparent to those skilled in the art upon a full understanding of the construction, arrangement and function of the several parts which have been combined to form the novel instrument for checking and inspecting contact lenses.

A preferred embodiment of the invention is presented herein, but it will, of course, be appreciated that the invention is susceptible of incorporation in other forms coming equally within the scope of the appended claims.

In the accompanying drawings:

FIG. 1 is a perspective view, from the front, of a preferred embodiment of the contact lens inspector;

FIG. 2 is an enlarged vertical central section taken through the contact lens inspector of FIG. 1;

FIG. 3 is a vertical section taken generally on the line 3—3 of FIG. 2;

FIG. 4 is an enlarged top plan view of the contact lens supporting member positioned for inspecting a contact lens for scratches and other surface defects;

FIG. 5 is a vertical section taken generally on the line 5—5 of FIG. 4 illustrating the tilting feature of the transparent window portion of the contact lens supporting member;

FIG. 6 is an enlarged vertical section of the transparent window portion of the contact lens supporting member taken generally on the line 6—6 of FIG. 4;

FIG. 7 is an enlarged top plan view of the lower polarizing filter;

FIG. 8 is a vertical section taken generally on the line 8—8 of FIG. 7;

FIG. 9 is a vertical section taken generally on the line 9—9 of FIG. 2;

FIG. 10 is a side elevational view of the attachable lens fixture;

FIG. 11 is a top plan view of the lens fixture of FIG. 10;

FIG. 12 is an enlarged fragmentary vertical section similar to FIG. 2 illustrating the position of the transparent portion of the lens supporting member for inspection of the peripheral curve of a contact lens;

FIG. 13 is an enlarged side elevational view of the vertically tilted lens supporting member taken generally on the line 13—13 of FIG. 12;

FIG. 14 is an enlarged horizontal section of the transparent window portion of the contact lens supporting member taken generally on the line 14—14 of FIG. 13; and FIG. 15 is a developed section taken generally on the line 15—15 of FIG. 13.

As viewed in FIGS. 1, 2, 3 and 9, the illustrated embodiment of the optical instrument for checking and inspecting contact lenses includes an enclosed generally rectangular upright housing 10 which is characterized by a top wall 11, a front wall 12, a rear wall 13, and side walls 14 and 15. Preferably, the lower portions of the front and rear walls 12 and 13 are flared or inclined outwardly whereby to provide a broad supporting base for the instrument. The open bottom of the housing 10 is closed by a base member 17 which is pivotally mounted at the rear of the housing 12 by a pair of suitable pivot pins 18 which extend through the lower edges of the side walls 14 and 15 and through a pair of upstanding side flanges 20 on the base member 17, at the rearmost portions thereof. A conventional latch device may be provided at the front edge of the base member 17. The four corners of the base member 17 are provided with suitable supporting feet or pads 19.

A first lamp socket 21 having a first illuminating bulb 22 received therein is suitably mounted on the side wall 15 adjacent the lower portion thereof. A conventional three position switch 23 for the lamp socket 21 and for a second lamp socket to be described is suitably mounted in the lower portion of the side wall 14. A power cord (not shown) including the necessary connections to the switch 23 and the two lamp sockets is also provided.

The top wall 11 of the housing 10 is provided midway between the side walls 14 and 15 with an opening 25. A sleeve member 26, which may be formed of nylon, having approximately the same inner diameter as that of the opening 25 extends downwardly from the underside of the top wall 11 of the housing 10 in axial alignment with the opening 25. An elongated rod member 27 is rotatably supported between the side walls 14 and 15 adjacent the upper edges thereof and slightly rearwardly of the opening 25 in the top wall 11. The ends of the rod member 27 disposed outwardly of the side walls 14 and 15 are provided with knobs 30 to facilitate rotation of the rod member 27. A tubular magnifying lens housing 31 slidably extends through the opening 25 in the top wall 11 and through the sleeve member 26. A vertically extending rack 33 is provided on the rear side of the lens housing 31 for engagement with a pinion formation 34 on the rod member 27 whereby vertical focusing adjustment of the lens housing 31 is controlled through the knobs 30. The inner surface of the upper end of the lens housing 31 is provided with an enlarged diameter portion defining a shoulder 35 (FIG. 2) upon which is supported a magnifying lens 36. A split ring 37 serves to retain the lens 36 in the lens housing 31. It has been found that a seven power magnification is sufficient for inspecting contact lenses. It is to be understood, however, that lenses of greater or lesser magnification power may be provided in the lens housing 31.

The front wall 12 of the housing 10 is provided with a pair of vertically spaced horizontally extending generally rectangular openings 40 and 41. The upper opening 40 is provided with a centrally located notch 39 in its upper edge for a purpose which will be evident hereinafter. A supporting structure 42 suitably mounted within the housing 10 includes a pair of spaced apart vertically disposed side plates 43 and 45 and a vertically disposed rear plate 47 with the side plates 43 and 45 being disposed at right angles to the openings 40 and 41 and aligned with the corresponding opposite ends thereof. A first pair of horizontally and rearwardly extending upper supporting rails 48 and 49 are mounted respectively on the side plates 43 and 45 with the supporting surfaces thereof being horizontally aligned with the lower edge of the opening 40. Likewise, a second pair of horizontally and rearwardly extending lower supporting rails 52 and 53 are mounted respectively on the side plates 43 and 45 with their supporting surfaces in alignment with the lower edge of the opening 41.

A contact lens supporting member 56, best shown in FIGS. 4, 5, 6, 13, 14 and 15 is adapted to be inserted through the opening 40 into the housing 10 for supporting engagement on the spaced apart supporting rails 48 and 49. The contact lens supporting member 56 includes an outer ring-like member 57, which may be formed of nylon, having a diameter slightly less than the width of the opening 40 and which is adapted for supporting engagement on the rails 48 and 49. A smaller ring-like member 58, which may also be formed of nylon, is mounted in the opening in the ring-like member 57 for tilting movement about a horizontal axis.

An apertured member 54, which may also be formed of nylon, is mounted in the opening in the smaller ring-like member 58. As viewed in FIG. 6, the upper end of the aperture 59 in the apertured member 54 is smaller in diameter than the lower end whereby to provide a downwardly facing shoulder 60 against which a transparent glass window 61 is disposed, the window 61 being retained against the shoulder 60 by a split ring 62. In the illustrated embodiment of the invention, the diameter of the aperture 59 in the contact lens supporting member 56 is in the order of 11 mm. As will be described hereinafter, the apertured member or transparent window portion 54 of the lens supporting member 56 is rotatable relative to the smaller ring-like member 58 in the plane thereof.

The smaller ring-like member 58 is tiltably supported in th opening in the larger ring-like member 57 by means of a pivot pin 63 and a hollow shaft 64 each of which has one end portion secured in a radial opening formed in the outer surface of the smaller ring-like member 58 with the opposite end portions being journaled in radial openings formed in the larger ring-like member 57. A pair of nylon spacer bearings 68 may be provided on the pivot pin 63 and the shaft 64 between the ring-like members 57 and 58. The hollow shaft 64 projects outwardly and away from the larger ring-like member 57 and is provided with a knob 69 on its outer end whereby to permit manually controlled tilting of the smaller ring-like member 58 supporting the transparent window 61 about a horizontal axis.

A contact lens to be checked and inspected is placed in the aperture 59 of the supporting member 56 on the window 61 where it is confined for limited tilting movement by the sides of the aperture 59 which may be curved outwardly adjacent the window 61 to better retain the lens in the aperture 59. The lens supporting member 56 is then inserted into the housing 10 through the opening 40 where it is supported on the rails 48 and 49. When the lens supporting member 56 abuts against the rear plate 47 of the supporting structure 42 the contact lens to be inspected and checked will be disposed in vertical alignment with and between the bulb 22 and the magnifying lens 36 with a portion of the larger ring-like member 57 and the tilting-control knob 69 being disposed externally of the housing 10. By tilting the smaller ring-like member 58 by means of the knob 69 to vary the passage of light through the contact lens, the surface thereof may be carefully inspected for scratches and other defects. After one surface has been checked, the lens supported member 56 may be withdrawn from the opening 40, the contact lens flipped over and the supporting member 56 again inserted into the opening 40 for inspecting the other surface for scratches and other defects. To permit checking certain dimensions of contact lenses during processing thereof, particularly during certain of the grinding operations, a reticle 71 (FIG. 4) calibrated, for example, from 1–10 mm. may be etched on the window 61.

By providing a pair of flat polarizing filters 74 and 75 in the housing 10 between the lamp 22 and the magnifying lens 36, the lighting within the housing 10 may be controlled by polarization thereof whereby to permit more accurate checking and inspecting of contact lenses. The flat polarizing filter 74 is non-rotatably mounted in the lower portion of the magnifying lens housing 31 and is retained therein by a split ring 76 (FIG. 2).

The flat polarizing filter 75 is mounted in a stepped opening 78 of a ring-like member 79 and is retained therein by a split ring 80. The ring-like member 79, which may be formed of nylon, is approximately the same diameter as the larger ring-like member 57 of the contact lens supporting member 56 whereby to permit insertion thereof through the opening 41 for supporting engagement on the rails 52 and 53. When the ring-like member 79 is inserted in the opening 41 in abutting engagement with the rear plate 47 of the supporting structure 42, an edge portion thereof projects outwardly of the housing 10. Preferably, the peripheral edge of the ring-like member 79 is knurled. By manipulation of the outwardly projecting edge portion of the ring-like member 79, the flat polarizing filter 75 may be rotated in a horizontal plane relative to the flat polarizing filter 74 whereby to polarize the light rays from the bulb 22 in a manner well known in the optical art. This flat polarization of the light rays passing through a contact lens disposed on the window 61 of the lens supporting member 56 varies the lighting within the housing 10 in a manner permitting more accurate checking and inspecting of the surfaces of contact lenses for the presence of dust and lint and for the detection of scratches and other surface defects. Polarization of the light rays from the bulb 22 further permits the detection of undesirable strain in a contact lens, the presence of which indicates that the base curve is not correct. The polarizing filters 74 and 75 may be formed of either glass or plastic as filters formed of either material have been found to be equally effective.

Provision is also made to permit inspection of the peripheral curve formed on the edge of contact lenses. It is of particular importance that the peripheral curve be properly ground inasmuch as the edge of the contact lens engages the eye ball of the person wearing the lens. A generally triangular or three armed lens fixture 82, which is preferably formed of nylon, is readily attachable to the lens supporting member 56. As best illustrated in FIGS. 10 and 11, the fixture 82 includes a centrally located cylindrical post 83, the outer end of which is provided with a concave depression 84 adapted to receive the convex surface of a contact lens to be inspected. The diameter of the post 83 is small enough to insure that the edge of the lens will project substantially therebeyond. To hold the lens in the depression 84, a small non-abrasive spongy clamping member 85 is resiliently held against the center of the lens. The clamping member 85 is supported on one end of a spring wire 86 the other end of which is anchored in the fixture 82. The wire 86 is coiled and bent in a manner whereby the clamping member 85 is normally urged toward the depression 84 in the post 83.

The fixture 82 is of a size to be received in the larger end of the aperture 59 in the apertured member 54 and each of the three arms is provided on its outer end with a small tab 87, which tabs are adapted to be snapped into a groove 88 formed in the apertured member 54 adjacent the split ring 62 whereby to attach the fixture 82 to the lens supporting member 56. The notch 39 formed in the upper edge of the uppermost opening 40 in the front wall 12 of the housing 10 permits insertion of the lens supporting member 56 therethrough with the lens fixture 82 attached.

After the lens supporting member 56 with the attached lens fixture 82 is inserted into the housing 10 through the opening 40, the smaller ring-like member 58 is tilted about a horizontal axis to a vertical position whereby to position a contact lens supported on the fixture 82 edgewise to the magnifying lens 36, as illustrated in FIG. 12.

To provide the necessary overhead illumination for inspecting the peripheral curvature of the lens edge, a second illuminating lamp 90 is disposed in one of the upper corners of the housing 10. The socket of the lamp 90 is mounted on the upper slightly curved end of a rigid bar member 91 which is held against the side wall 14 of the housing 10 by a conventional bolt and wing nut fastener 92. A pair of guide members 93 mounted on the side wall 14 serve to retain the bar member 91 in a vertical position. The lamp 90 is wired to the three position switch 23 in a conventional manner. When the fastener 92 is released, the bar member 91 and the attached lamp socket may be removed as a unit from the housing 10 for ready replacement of the lamp 90, assuming the base member 17 has been pivoted to its open position. Likewise, the first bulb 22 may also be replaced when necessary by pivotally opening the base member 17.

Provision is made for directing the rays from the lamp 90 toward the contact lens to be inspected in the form of a conventional reflector 95 which is suitably mounted in the upper corner of the housing 10. As illustrated in FIGS. 2 and 12, portions of the tubular magnifying lens housing 31 and the sleeve member 26 may be removed to prevent blocking the rays from the lamp 90.

As previously mentioned herein, the apertured member 54 of the lens supporting member 56, to which the lens fixture 82 is attachable, is rotatable relative to the smaller ring-like member 58 and in the plane thereof whereby to permit inspection of the peripheral curvature along the entire edge of the lens. As best illustrated in FIGS. 6 and 14, the apertured member 54 is rotatably slidable in the opening in the smaller ring-like member 58 between an inwardly extending flange or shoulder 98 and a split ring 99. The peripheral edge of the apertured member 54 is provided with an annular groove or slot 100 into which extends the inner end of a shaft 102 which is rotatably mounted in the hollow tilting shaft 64 in concentric relationship therewith. The apertured member 54 is provided in one surface thereof with a circular arrangement of small openings 103 which intersect the groove 100 and serve to provide a rack-like formation engageable by a sprocket 105 mounted on the end of the shaft 102, as illustrated in FIG. 15. The outer end of the shaft 102 is provided with a control knob 106 which is disposed outwardly of and adjacent to the control knob 69 of the hollow shaft 64. With the smaller ring-like member 58 of the lens supporting member 56 tilted to the vertical position shown in FIG. 12 by the knob 69, rotation of the shaft 102 by the knob 106 will cause rotation of the apertured member 54 in a vertical plane through engagement of the sprocket 105 with the circular rack formation 103 whereby all portions of the edge of a contact lens supported in the fixture 82 attached to the apertured member 54 will be progressively positioned for inspection of the peripheral curvature thereof through the magnifying lens 36.

The optical instrument disclosed herein provides a simple and convenient means for accurately checking and inspecting contact lenses. In operation, after the lamp 22 only has been turned on by the switch 23, a contact lens is placed on the window 61 of the aperture 59 of the lens supporting member 56 which is then inserted into the housing 10 through the opening 40. The lighting within the housing 10 may be controlled by rotating the ring-like member 79 in which the polarizing filter 75 is mounted and the position of the contact lens relative to the lamp 22 may be varied either by rotating the apertured member 54 in the plane of the smaller ring-like member 58 by means of the knob 106 or by tilting the smaller ring-like member 58 by means of the knob 69. The magnifying lens 36 may be readily focused by means of the knobs 30. This procedure permits final inspection of a processed contact lens for scratches and other surface defects as well as checking certain dimensions thereof by means of the reticle 71 during the numerous grinding operations involved in processing contact lenses. To inspect the peripheral curvature of the edges of the contact lenses, the lamp 22 is switched off and the lamp 90 is switched on. The lens to be inspected is then mounted on the fixture 82 which is readily attachable to the apertured member 54 of the lens supporting member 56 for insertion into the housing 12 through the opening 40. By manipulation of the knobs 69 and 106 in the manner described all portions of the edge of the contact lens may be inspected through the magnifying lens 36 to check the peripheral curvature thereof.

I claim:

1. An optical instrument for checking and inspecting contact lenses comprising, an enclosed upright housing, a lamp mounted in the upper portion of said housing, a tubular magnifying lens housing mounted in an opening in the top of said housing for vertical focusing movement, a magnifying lens mounted in said tubular lens housing, a horizontally extending opening formed in the front of said instrument housing, a pair of spaced apart supporting rails extending rearwardly through said housing from the opposite ends of said opening in horizontal alignment with the lower edge of said opening, a contact lens supporting member insertable through said opening for supporting engagement on said pair of supporting rails whereby to position a contact lens beneath said magnifying lens for edgewise inspection thereof, said contact lens supporting member being characterized by an outer ring-like portion supportable on said rails, by an inner ring-like portion which is tiltable about a horizontal axis from a horizontal position in the plane of said outer ring-like portion to a vertical position, and by a central portion which is supported in said inner ring-like portion for rotation relative thereto and in the plane thereof, means for mounting a contact lens on said central portion in a manner such that the contact lens is disposed edgewise beneath said magnifying lens when said inner ring-like portion is tilted into its vertical position, means for manually tilting said inner ring-like portion, and means for manually rotating said central portion when the contact lens is disposed edgewise to the magnifying lens whereby to permit inspection of all portions of the edge of the contact lens and checking of the peripheral curvature thereof.

2. An optical instrument for checking and inspecting contact lenses comprising, an enclosed upright housing, a first lamp mounted in the lower portion of said housing, a second lamp mounted in the upper portion of said housing, switch means for selectively energizing said first and second lamps, a tubular magnifying lens housing mounted in an opening in the top of said housing for vertical focusing movement, a magnifying lens mounted in said tubular lens housing, a horizontally extending opening formed in the front of said instrument housing, a pair of spaced apert supporting rails extending rearwardly through said housing from the opposite ends of said opening in horizontal alignment with the lower edge thereof, a contact lens supporting member insertable through said opening for supporting engagement on said pair of supporting rails whereby to position a contact lens beneath said magnifying lens for checking and inspection thereof, said lens supporting member being characterized by an outer ring-like portion supportable on said rails, by an inner ring-like portion which is supported in said outer ring-like portion for tilting movement about a horizontal axis, and by a central apertured window portion disposed in the central opening of said inner ring-like portion for positioning a contact lens disposed flatwise thereon between said first lamp and said magnifying lens whereby to permit inspection of the convex and concave surfaces thereof for scratches and other surface defects when said first lamp is energized, separate means for mounting a contact lens on said central window portion in spaced relation thereto and in a manner such that the contact lens is disposed edgewise beneath said magnifying lens when said inner ring-like portion of said lens supporting member is tilted into a vertical position, means adapted to project through said opening in said housing for manually tilting said inner ring-like portion of said lens supporting member, means mounting said central apertured window portion for rotation relative to said inner ring-like portion and in the plane thereof, and means adapted to project through said opening in said housing for manually rotating said central apertured window portion when the contact lens is disposed edgewise to said magnifying lens whereby to permit inspection of all portions of the edge of the contact lens and checking of the peripheral curvature thereof when said second lamp is energized.

3. An optical instrument for checking and inspecting contact lenses comprising, an enclosed upright housing, a lamp supported in the lower portion of said housing, a tubular magnifying lens housing mounted for vertical movement in an opening in the top of said housing, a magnifying lens mounted in the upper end of said tubular lens housing, a vertically extending rack formation on one side of said lens housing, manually rotatable pinion means supported in the upper portion of said instrument housing in engagement with said rack on said tubular lens housing whereby to readily permit vertical focusing adjustment of said magnifying lens, a horizontally extending opening formed in the front of said housing, a pair of spaced apart supporting rails disposed in horizontal alignment with the lower edge of said opening, said pair of rails extending horizontally and rearwardly through said housing from the opposite ends of said opening, and a contact lens supporting member adapted to be inserted through said opening for supporting engagement on said pair of supporting rails whereby to position a contact lens disposed thereon between said lamp and said magnifying lens for checking and inspection thereof, said contact lens supporting member being characterized by an outer ring-like portion, a transparent window portion mounted in the central opening of said ring-like portion for tilting movement about a horizontal axis, and a manually operable member connected to said window portion and adapted to extend outwardly through said opening in said instrument housing to facilitate controlling the tilting of said window portion of said contact lens supporting member whereby to vary the passage of light through a contact lens supported on said window portion, and a calibrated reticle etched on said window portion of said contact lens supporting member whereby to permit checking various dimensions of a contact lens supported thereon.

4. An optical instrument for checking and inspecting contact lenses comprising, an enclosed upright housing, a lamp supported in the upper portion of said housing, a tubular magnifying lens housing mounted for vertical movement in an opening in the top of said housing, a magnifying lens mounted in said tubular lens housing, a vertically extending rack formation on one side of said lens housing, manually rotatable pinion means supported in the upper portion of said instrument housing in engagement with said rack formation on said tubular lens housing whereby to readily permit vertical focusing adjustment of said magnifying lens, a horizontally extending opening formed in the front of said housing, a pair of spaced apart supporting rails disposed in horizontal alignment with the lower edge of said opening, said pair of rails extending horizontally and rearwardly through said housing from the opposite ends of said opening, and a contact lens supporting member comprising, an outer ring-like portion adapted to be supported on said spaced apart rails, an inner ring-like portion mounted in the central opening of said outer ring-like portion on a pivot pin and a hollow shaft for tilting movement about a horizontal axis, said hollow shaft projecting through one side of said outer ring-like portion and being operably connected at its inner end to said inner ring-like portion for controlling the tilting thereof, a central portion mounted in the central opening of said inner ring-like portion for rotation in the plane thereof, a shaft member concentrically rotatable within said hollow shaft and projecting from opposite ends thereof, a sprocket carried on the inner end of said inner shaft and for engagement with a circular rack formation formed on said central portion for rotating the same, and a lens fixture removably attached to said central portion and having means thereon engageable with the center of a contact lens for clamping the same to said fixture, said lens supporting member being insertable through said opening for supporting engagement of said outer ring-like portion on said pair of supporting rails whereupon said outer hollow shaft member is adapted to be rotated sufficiently to tilt said inner ring-like portion into a vertical position whereby to dispose a contact lens clamped to said lens fixture in an edgewise position beneath said magnifying lens and whereupon said inner shaft is adapted to be rotated to rotate said central portion and said lens fixture attached thereto in a vertical plane whereby to permit inspection of the entire edge of the contact lens for checking the peripheral curvature thereof.

5. An optical instrument as recited in claim 4 wherein said lens fixture comprises, a body portion having a series of tabs on its outer edge adapted for engagement in slot means formed in said central portion of said lens supporting member for attachment of said fixture thereto, a centrally located cylindrical post on said body portion having a concave depression in its outer end for receiving the convex surface of a contact lens with the diameter of said post being small enough that the edges of the contact lens project therebeyond, and a non-abrasive clamping member adapted for resilient engagement with the center of the concave surface of the contact lens whereby to resiliently clamp the contact lens in said depression in said post, said clamping member being mounted on one end of a wire spring anchored in the body portion of said fixture and adapted to resiliently urge said clamping member toward the center of said depression in the end of said post.

6. An optical instrument for checking and inspecting contact lenses comprising, an enclosed upright housing, a first lamp mounted in the lower portion of said housing, a second lamp mounted in the upper portion of said housing, switch means for selectively energizing either said first lamp or said second lamp, a magnifying lens mounted in an opening in the top of said housing, a horizontally extending opening formed in one side of said housing, a contact lens supporting member insertable through said opening in said housing and being characterized by an outer ring-like portion, an inner ring-like portion mounted in the central opening of said outer ring-like portion for tilting movement about a horizontal axis, and by an apertured window portion disposed in the central opening of said inner ring-like portion for positioning a contact lens supported flatwise thereon between said magnifying lens and said first lamp whereby to permit inspection of the concave and convex surfaces of the contact lens for scratches and other surface defects, a separate contact lens fixture attachable to said apertured window portion and having means thereon adapted for clamping engagement with the center of a contact lens whereby to permit the contact lens to be disposed edgewise beneath said magnifying lens when said inner ring-like portion is tilted to a vertical position in said housing, first manually manipulable shaft means extending through one side of said outer ring-like portion and operably connected to said inner ring-like portion for controlling the tilting of said inner ring-like portion of said lens supporting member, means mounting said apertured window portion of said lens supporting member for rotation relative to said inner ring-like portion and in the plane thereof, second manually manipulable shaft means rotatable within said first shaft means and operably connected by sprocket and rack means to said apertured window portion for rotating the same when said inner ring-like member is in said vertical position whereby to permit complete inspection of the edge of the contact lens supported on said fixture when the contact lens is disposed in edgewise relationship to the magnifying lens and when said second lamp is energized for checking the peripheral curvature thereof, and means for supporting said outer ring-like portion of said lens supporting member within said housing beneath said magnifying lens.

7. An optical instrument for checking and inspecting contact lenses comprising, an enclosed upright housing, a first lamp mounted in the lower portion of said housing, a second lamp mounted in the upper portion of said housing, switch means for selectively energizing either said first lamp or said second lamp, a magnifying lens mounted in an opening in the top of said housing, a horizontally extending opening formed in one side of said housing, a contact lens supporting member insertable through said opening in said housing and being characterized by an outer ring-like portion, an inner ring-like portion mounted in the central opening of said outer ring-like portion for tilting movement about a horizontal axis and by an apertured window portion disposed in the central opening of said inner ring-like portion for positioning a contact lens supported flatwise thereon between said magnifying lens and said first lamp whereby to permit inspection of the concave and convex surfaces of the contact lens for scratches and other surface defects, a first polarizing filter non-rotatably supported in said housing above said opening, a second polarizing filter rotatably supported in said housing below said opening whereby to permit controlling, by polarization, the light rays from said first lamp upon rotation of said second filter relative to said first filter to facilitate inspecting the surfaces of the contact lens, a separate contact lens fixture attachable to said apertured window portion and having means thereon adapted for clamping engagement with the center of a contact lens whereby to permit the contact lens to be disposed edgewise beneath said magnifying lens when said inner ring-like portion is tilted to a vertical position in said housing, first manually manipulable shaft means extending through one side of said outer ring-like portion and operably connected to said inner ring-like portion for controlling the tilting of said inner ring-like portion of said lens supporting member, means mounting said apertured window portion of said lens supporting member for rotation relative to said inner ring-like portion and in the plane thereof, second manually manipulable shaft means rotatable within said first shaft means and operably connected to said apertured window portion for rotating the same when said inner ring-like member is in said vertical position whereby to permit complete inspection of the edge of the contact lens supported on said fixture when the contact lens is disposed in edgewise relationship to the magnifying lens and when said second lamp is energized for checking the peripheral curvature thereof, and means for supporting said outer ring-like portion of said lens supporting member within said housing beneath said magnifying lens.

8. An optical instrument for checking and inspecting contact lenses comprising, an enclosed upright housing, a lamp mounted in the lower portion of said housing, a tubular magnifying lens housing mounted in an opening in the top of said housing for vertical focusing movement, a magnifying lens mounted in the upper end of said tubular lens housing, a pair of vertically spaced horizontally extending openings formed in the front of said instrument housing, a pair of spaced apart supporting rails extending rearwardly through said housing from the opposite ends of each of said openings, each pair of said rails being horizontally aligned with the lower edge of its associated opening, a contact lens supporting member having a centrally located window portion, which is mechanically tiltable about a horizontal axis, said supporting member being insertable through the upper one of said openings for supporting engagement on the upper pair of supporting rails whereby to position a contact lens disposed on said window portion between said lamp and said magnifying lens for checking and inspection thereof, a calibrated reticle etched on the window portion of said lens supporting member whereby to permit checking various dimensions of the contact lens, a first flat polarizing filter non-rotatably mounted in the lower end of said tubular magnifying lens housing, and a second flat polarizing filter supported on the pair of supporting rails associated with the lower opening in said instrument housing for rotation relative to said first polarizing filter whereby to control the lighting in said instrument housing by polarization.

9. An optical instrument for checking and inspecting contact lenses comprising, an enclosed upright housing, a lamp mounted in the lower portion of said housing, a tubular magnifying lens housing mounted in an opening in the top of said housing for vertical focusing movement, a magnifying lens mounted in the upper end of said tubular housing, a pair of vertically spaced horizontally extending openings formed in the front of said instrument housing, a pair of spaced apart supporting rails extending rearwardly through said housing from the opposite ends of each of said openings, each pair of said rails being horizontally aligned with the lower edge of its associated opening, a contact lens supporting member having a centrally located window portion, said supporting member being insertable through the upper one of said openings for supporting engagement on the upper pair of supporting rails whereby to position a contact lens disposed on said window portion between said lamp and said magnifying lens for checking and inspection thereof, mechanical means for tilting said window portion of said lens supporting member about a horizontal axis whereby to vary the passage of light through the contact lens, a first flat polarizing filter non-rotatably mounted in the lower end of said tubular magnifying lens housing, and a second flat polarizing filter supported on the pair of supporting rails associated with the lower opening in said instrument housing for rotation relative to said first polarizing filter whereby to control the lighting in said instrument housing by polarization.

10. An optical instrument for checking and inspecting contact lenses comprising, an enclosed upright housing, a first lamp mounted in the lower portion of said housing, a second lamp mounted in the upper portion of said housing, switch means for selectively energizing said first and second lamps, a tubular magnifying lens housing mounted in an opening in the top of said housing for vertical focusing movement, a magnifying lens mounted in the upper end of said tubular lens housing, a pair of vertically spaced horizontally extending openings formed in the front of said instrument housing, a pair of spaced apart supporting rails extending rearwardly through said housing from the opposite ends of each of said openings, each pair of said rails being horizontally aligned with the lower edge of its associated opening, a contact lens supporting member insertable through said upper opening for supporting engagement on the upper pair of supporting rails whereby to position a contact lens beneath said magnifying lens for checking and inspection thereof, said lens supporting member being characterized by an outer ring-like portion supportable on said upper rails, by an inner ring-like portion which is supported in said outer ring-like portion for tilting movement about a horizontal axis, and by a central apertured window portion disposed in the central opening in said inner ring-like portion for positioning a contact lens disposed flatwise thereon between said first lamp and said magnifying lens whereby to permit inspection of the convex and concave surfaces thereof for scratches and other surface defects when said first lamp is energized, a first flat polarizing filter non-rotatably mounted in the lower end of said tubular magnifying lens housing, a second flat polarizing filter supported on the pair of supporting rails associated with the lower opening in the front of said instrument housing for rotation relative to said first polarizing filter whereby to vary the light rays from said first lamp by polarization thereof and thereby facilitate inspection of the surfaces of the contact lens, separate means for mounting a contact lens on said central window portion in spaced relation thereto and in a manner such that the contact lens is disposed edgewise beneath said magnifying lens when said inner ring-like portion of said lens supporting member is tilted into a vertical position, means for manually tilting said inner ring-like portion of said lens supporting member, means mounting said central apertured window portion for rotation relative to said inner ring-like portion and in the plane thereof, and means for manually rotating said central apertured window portion when the contact lens is disposed edgewise to said magnifying lens whereby to permit inspection of all portions of the edge of the contact lens and checking of the peripheral curvature thereof when said second lamp is energized.

11. An optical instrument for checking and inspecting contact lenses comprising, an enclosed upright housing, a lamp supported in the lower portion of said housing, a tubular magnifying lens housing mounted for vertical movement in an opening in the top of said housing, a magnifying lens mounted in the upper end of said tubular lens housing, a vertically extending rack formation on one side of said lens housing, manually rotatable pinion means supported in the upper portion of said instrument housing in engagement with said rack on said tubular lens housing whereby to readily permit vertical focusing adjustment of said magnifying lens, a pair of vertically spaced horizontally extending openings formed in the front of said housing, a pair of spaced apart supporting rails disposed in horizontal alignment with the lower edge of each of said openings, each pair of said rails extending horizontally and rearwardly through said housing from the opposite ends of its associated openings, a contact lens supporting member adapted to be inserted through the upper one of said openings for supporting engagement on the pair of supporting rails associated therewith whereby to position a contact lens disposed thereon between said lamp and said magnifying lens for checking and inspection thereof, said contact lens supporting member being characterized by an outer ring-like portion, a transparent window portion mounted in the central opening of said ring-like portion for tilting movement about a horizontal axis, and a manually operable member connected to said window portion and adapted to extend outwardly through said upper opening in said instrument housing to facilitate controlling the tilting of said window portion of said contact lens supporting member, a calibrated reticle etched on said window portion of said contact lens supporting member whereby to permit checking various dimensions of a contact lens supported thereon, a first flat polarizing filter non-rotatably mounted in the lower end of said tubular magnifying lens housing, and a second flat polarizing filter mounted in a ring-like member which is rotatably supported on the pair of supporting rails associated with the lower opening whereby rotation of said second polarizing filter relative to said first polarizing filter is effective to control, by polarization, the lighting in said instrument housing, an edge portion of said ring-like member projecting outwardly through said lower opening whereby to permit manual rotation of said second polarizing filter.

12. An optical instrument for checking and inspecting contact lenses comprising, a generally vertically extending housing, magnifying lens means mounted in the upper portion of said housing for viewing the interior thereof, an opening formed in a side wall of said housing, fixed support means in said housing adjacent said opening for removably supporting a contact lens supporting member inserted through said opening so that the former is aligned with the optical axis of said magnifying lens means, said contact lens supporting member being removable and insertable through said opening and including relatively movable first and second members for mounting a contact lens to be inspected, said contact lens supporting member including control means arranged to extend exteriorly of said opening when the contact lens supporting member is supported on said fixed support means, said first and second movable members being movable relative to each other by said control means for locating a contact lens in a first position wherein the optical axis of the lens is substantially coaxial with the optical axis of said magnifying lens means and a second position wherein the optical axis of the contact lens is substantially at a right angle to the optical axis of the magnifying lens means, and lamp means in said housing for illuminating a contact lens mounted in either of said positions.

13. The optical instrument according to claim 12 wherein said contact lens supporting member includes a planar member removably supported by said fixed support means and having a circular aperture therein, said first movable member being a ring member mounted in said aperture for pivoting movement about an axis defining a diameter of both said ring member and said aperture, and said second movable member also being a ring member concentrically mounted in said first movable member for rotation in a plane containing the latter.

References Cited in the file of this patent
UNITED STATES PATENTS

| | | |
|---|---|---|
| 1,916,609 | Emmons | July 4, 1933 |
| 2,191,107 | Glancy | Feb. 20, 1940 |
| 2,290,566 | Lockhart | July 21, 1942 |
| 2,340,893 | Meister | Feb. 8, 1944 |
| 2,435,953 | Bennett | Feb. 17, 1948 |
| 2,510,998 | O'Brien | June 13, 1950 |
| 2,624,237 | Davis | Jan. 6, 1953 |
| 2,683,392 | Ellis | July 13, 1954 |
| 2,691,306 | Beams et al. | Oct. 12, 1954 |
| 2,785,601 | Francon | Mar. 19, 1957 |
| 2,844,994 | Filler | July 29, 1958 |
| 2,930,130 | Ray et al. | Mar. 29, 1960 |
| 3,019,708 | French et al. | Feb. 6, 1962 |

OTHER REFERENCES

The American Mineralogist Journal of Mineralogical Society of America, volume 14, No. 12, December 1929, pages 443 and 445 only.